United States Patent
Hayashi et al.

(10) Patent No.: US 7,125,008 B2
(45) Date of Patent: Oct. 24, 2006

(54) AIR-SPRING VIBRATION ISOLATION DEVICE

(75) Inventors: Akihiro Hayashi, Saitama-ken (JP); Keiji Tamaki, Saitama-ken (JP); Masakuni Kainuma, Saitama-ken (JP)

(73) Assignee: Fujikura Rubber Ltd., Tokyo (JP)

( * ) Notice: Subject to any disclaimer, the term of this patent is extended or adjusted under 35 U.S.C. 154(b) by 0 days.

(21) Appl. No.: 11/040,437

(22) Filed: Jan. 21, 2005

(65) Prior Publication Data

US 2005/0161870 A1 Jul. 28, 2005

(30) Foreign Application Priority Data

Jan. 22, 2004 (JP) .............................. 2004-014847

(51) Int. Cl.
*F16F 9/04* (2006.01)

(52) U.S. Cl. ..................... 267/34; 267/64.27; 267/136

(58) Field of Classification Search ........ 188/378–380; 267/33–35, 136, 64.23, 64.27; 248/550
See application file for complete search history.

(56) References Cited

U.S. PATENT DOCUMENTS

| | | | |
|---|---|---|---|
| 2,610,016 A | | 9/1952 | Crede |
| 3,162,164 A | | 12/1964 | Eck |
| 4,398,704 A | * | 8/1983 | Buchanan et al. ........ 267/64.21 |
| 4,428,302 A | * | 1/1984 | Herring, Jr. .............. 105/198.1 |
| 4,783,089 A | * | 11/1988 | Hamilton et al. ......... 280/6.157 |
| 6,170,622 B1 | * | 1/2001 | Wakui et al. ................ 188/378 |
| 6,322,060 B1 | * | 11/2001 | Mayama et al. ............. 267/136 |
| 6,332,602 B1 | * | 12/2001 | Oishi ......................... 267/122 |
| 6,877,711 B1 | * | 4/2005 | Kainuma et al. ............ 248/638 |

FOREIGN PATENT DOCUMENTS

| | | | |
|---|---|---|---|
| JP | 61 252928 | | 11/1986 |
| JP | 08 170689 | | 11/1996 |
| JP | 2002 070911 | | 3/2002 |
| JP | 56640 | * | 2/2003 |
| JP | 148540 | * | 5/2003 |

* cited by examiner

Primary Examiner—Christopher P. Schwartz
(74) Attorney, Agent, or Firm—McCormick, Paulding & Huber LLP

(57) ABSTRACT

A vibration isolation device including a stationary housing; a movable top plate positioned horizontally above the stationary housing; an airtight flexible member forming an airtight pressure chamber between the movable top plate and the stationary housing; a vibration-free movable base having a mounting plate portion; and a dome-shaped contacting portion, provided between opposed surfaces of the movable top plate and the mounting plate portion. The movable top plate is moved up and down by varying an internal pressure of the airtight pressure chamber. The vibration-free movable base is moved up and down via the dome-shaped contacting portion. The vibration isolation device includes a biasing device, positioned inside the airtight pressure chamber for holding the planar centers of the movable top plate and the mounting plate portion in contact with each other when the internal pressure of the airtight pressure chamber is smaller than a predetermined value.

11 Claims, 4 Drawing Sheets

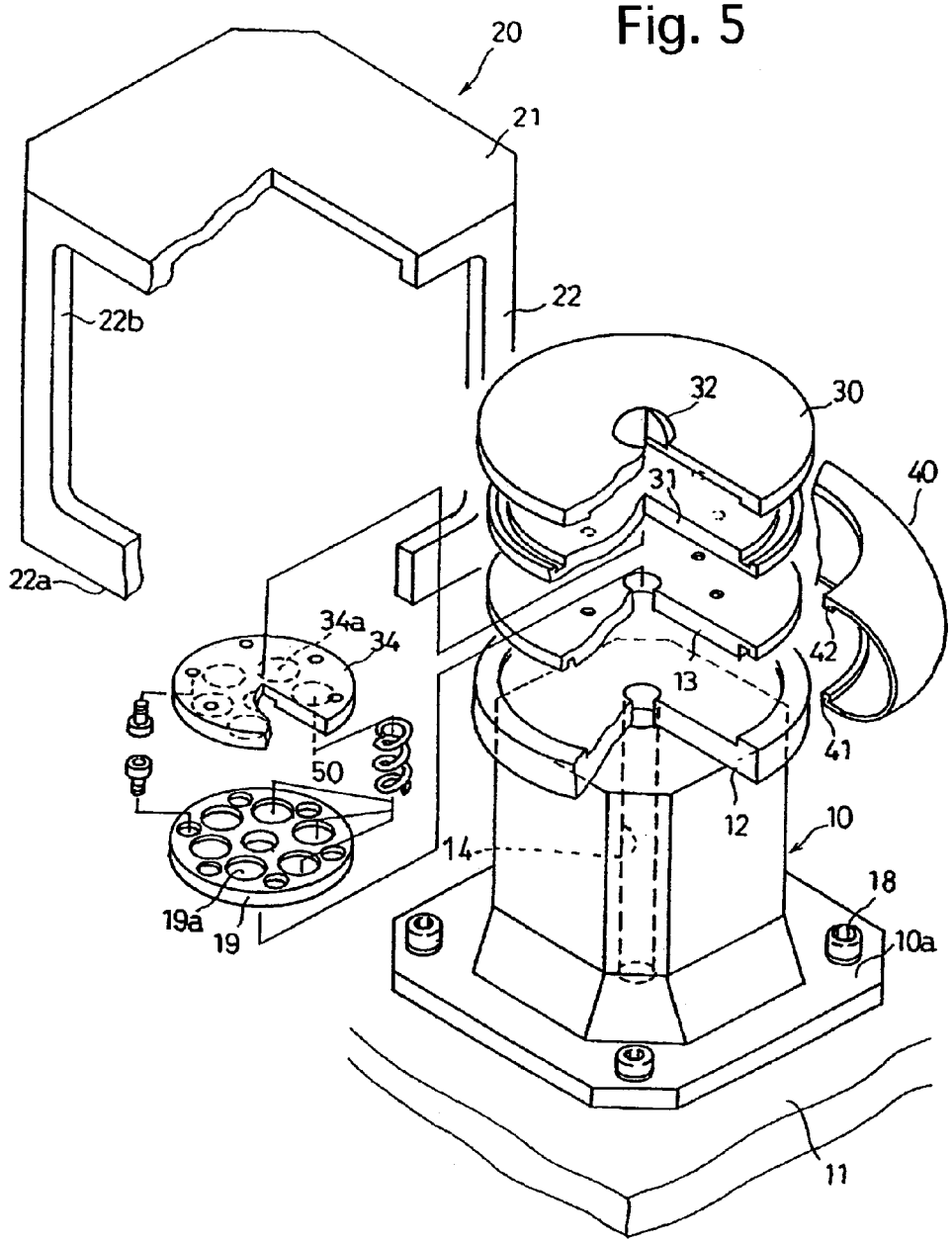

AIR-SPRING VIBRATION ISOLATION DEVICE

CROSS REFERENCE TO RELATED APPLICATION

The present application is related to and claims priority of the following co-pending application, namely, Japanese patent application No. 2004-14847 filed on Jan. 22, 2004.

BACKGROUND OF THE INVENTION

1. Field of the Invention

The present invention relates to an air-spring vibration isolation device for supporting an object to be isolated from vibration such as a precision instrument while isolating the object from vibration transmitted from the floor to the vibration isolation device.

2. Description of the Related Art

In a typical air-spring vibration isolation device, vibration transmitted from the floor to a stationary housing of the vibration isolation device is prevented from being transmitted to a vibration-free movable base of the vibration isolation device by supporting the vibration-free movable base on the stationary housing via an airtight pressure chamber (airtight flexible member) while introducing regulated air pressure into the airtight pressure chamber.

To obtain further improvement in vibration isolating performance, this type of air-spring vibration isolation device using air pressure, which is provided with a movable top plate that moves up and down by the airtight pressure chamber without the vibration-free movable base being directly supported by the airtight pressure chamber, wherein the vibration-free movable base is allowed to swing (oscillate) relative to the movable top plate by a structure in which the movable top plate and a mounting plate portion of the vibration-free movable base are arranged to face each other so as to be in point contact with each other via a dome-shaped (hemispherical) contacting portion installed between opposed surfaces of the movable top plate and the mounting plate portion at a planar center thereof, is known in the art.

In this particular type of air-spring vibration isolation device that uses such a dome-shaped contacting portion, the movable top plate descends toward the stationary housing to release the point-contacting engagement of the movable top plate with the mounting plate portion via the dome-shaped contacting portion if the air pressure applied to the airtight pressure chamber is removed, e.g., during the time when the vibration isolation device is in a non-operational state. Thereafter, when the vibration isolation device resumes operating, air pressure is again introduced into the airtight pressure chamber to move up the movable top plate via the dome-shaped contacting portion. Although it is a matter of course that the two-dimensional positioning of the vibration-free movable base relative to the stationary housing is precisely established in advance, this precise two-dimensional positioning of the vibration-free movable base relative to the stationary housing is lost once the point-contact engagement of the movable top plate with the mounting plate portion of the vibration-free movable base is released, which proves it to be impossible to reproduce the original vibration isolating performance.

SUMMARY OF THE INVENTION

The present invention provides an air-spring vibration isolation device, wherein the movable top plate and the mounting plate portion remain in contact with each other via the dome-shaped contacting portion, which is provided between the movable top plate and the mounting plate portion, even if the internal pressure of the airtight pressure chamber is released, and accordingly the original vibration isolating performance remains unchanged in the operation of the vibration isolation device after the release of the internal pressure of the airtight pressure chamber.

According to an aspect of the present invention, a vibration isolation device is provided including a stationary housing; a movable top plate positioned horizontally above the stationary housing; an airtight flexible member for forming an airtight pressure chamber between the movable top plate and the stationary housing; a vibration-free movable base having a mounting plate portion on which an object to be isolated from vibration is mounted, the vibration-free movable base being positioned horizontally to face the movable top plate, and being capable of moving up and down relative to the stationary housing; and a dome-shaped contacting portion, provided between opposed surfaces of the movable top plate and the mounting plate portion, via which planar centers of the movable top plate and the mounting plate portion are capable of coming into point contact with each other. The movable top plate is moved up and down by varying an internal pressure of the airtight pressure chamber. The vibration-free movable base is moved up and down via the dome-shaped contacting portion. The vibration isolation device includes a biasing device, positioned inside the airtight pressure chamber, for defining a downward movement limit of the movable top plate relative to the stationary housing, and for holding the planar centers of the movable top plate and the mounting plate portion in contact with each other when the internal pressure of the airtight pressure chamber is smaller than a predetermined value.

It is desirable for the biasing device to be positioned inside the airtight pressure chamber in such a manner as to exert no biasing force on the movable top plate when the vibration isolation device performs a vibration isolating operation in a state where the internal pressure of the airtight pressure chamber is one of equal to and greater than the predetermined value.

It is desirable for the biasing device to include a plurality of springs installed between the movable top plate and the stationary housing.

It is desirable for the plurality of springs to be positioned at equi-angular intervals.

It is desirable for each of the plurality of springs to be a compression coil spring.

Each compression coil spring can be fixed at one end thereof to one of the movable top plate and the stationary housing.

It is desirable for the vibration isolation device to further include a first spring-seating plate fixed to the movable top plate, the first spring-seating plate having a first plurality of recesses; and a second spring-seating plate fixed to the stationary housing to face the first spring-seating plate, the second spring-seating plate having a second plurality of recesses. The plurality of compression coil springs are positioned between the first spring-seating plate and the second spring-seating plate so that one end of each of the plurality of compression coil springs is accommodated in each corresponding one of the second plurality of recesses, and so that the other end of each of the plurality of compression coil springs is capable of being engaged and disengaged with each corresponding one of the first plurality of recesses.

It is desirable for the dome-shaped contacting portion to include a dome-shaped member formed on an upper surface of the movable top plate to project upwards; and a plane lower surface of the mounting plate portion with which the dome-shaped member is capable of coming into contact.

It is desirable for the vibration-free movable base to include a hollow cylindrical portion which extends downwards from a peripheral edge of the mounting plate portion. A downward movement limit of the vibration-free movable base is determined by engagement of a bottom end surface of the hollow cylindrical portion with a stop surface formed on the stationary housing.

It is desirable for the vibration isolation device to include a horizontal plate fixed to an upper end of the stationary housing, wherein the airtight flexible member includes an annular bellows, opposite ends of which are fixed to the horizontal plate and the movable top plate, respectively.

In an embodiment, a vibration isolation device is provided, including a stationary housing; a horizontal plate fixed to an upper end of the stationary housing; a movable top plate positioned horizontally above the horizontal plate; a mounting plate on which an object to be isolated from vibration is mounted, the mounting plate being positioned horizontally to face the movable top plate in a manner to be capable of moving up and down relative to the stationary housing; a bellows installed between the movable top plate and the horizontal plate to form an airtight pressure chamber therebetween; a dome-shaped member fixed to an upper surface of the movable top plate to project upwards toward a bottom surface of the mounting plate; and a biasing device, positioned inside the airtight pressure chamber, for defining a downward movement limit of the movable top plate relative to the stationary housing, and for holding the planar centers of the movable top plate and the mounting plate in contact with each other when an internal pressure of the airtight pressure chamber is smaller than a predetermined value.

According to the present invention, in the air-spring vibration isolation device using the dome-shaped contacting portion, the movable top plate and the mounting plate portion remain in contact with each other via the dome-shaped contacting portion, which is provided between the movable top plate and the mounting plate portion, even if the internal pressure of the airtight pressure chamber is released, and accordingly the original vibration isolating performance remains unchanged in the operation of the vibration isolation device after the release of the internal pressure of the airtight pressure chamber.

BRIEF DESCRIPTION OF THE DRAWINGS

The present invention will be described below in detail with reference to the accompanying drawings in which:

FIG. 5 is a partially cutaway view in perspective of the air-spring vibration isolation device shown in FIG. 1.

DESCRIPTION OF THE PREFERRED EMBODIMENTS

Figure 1:
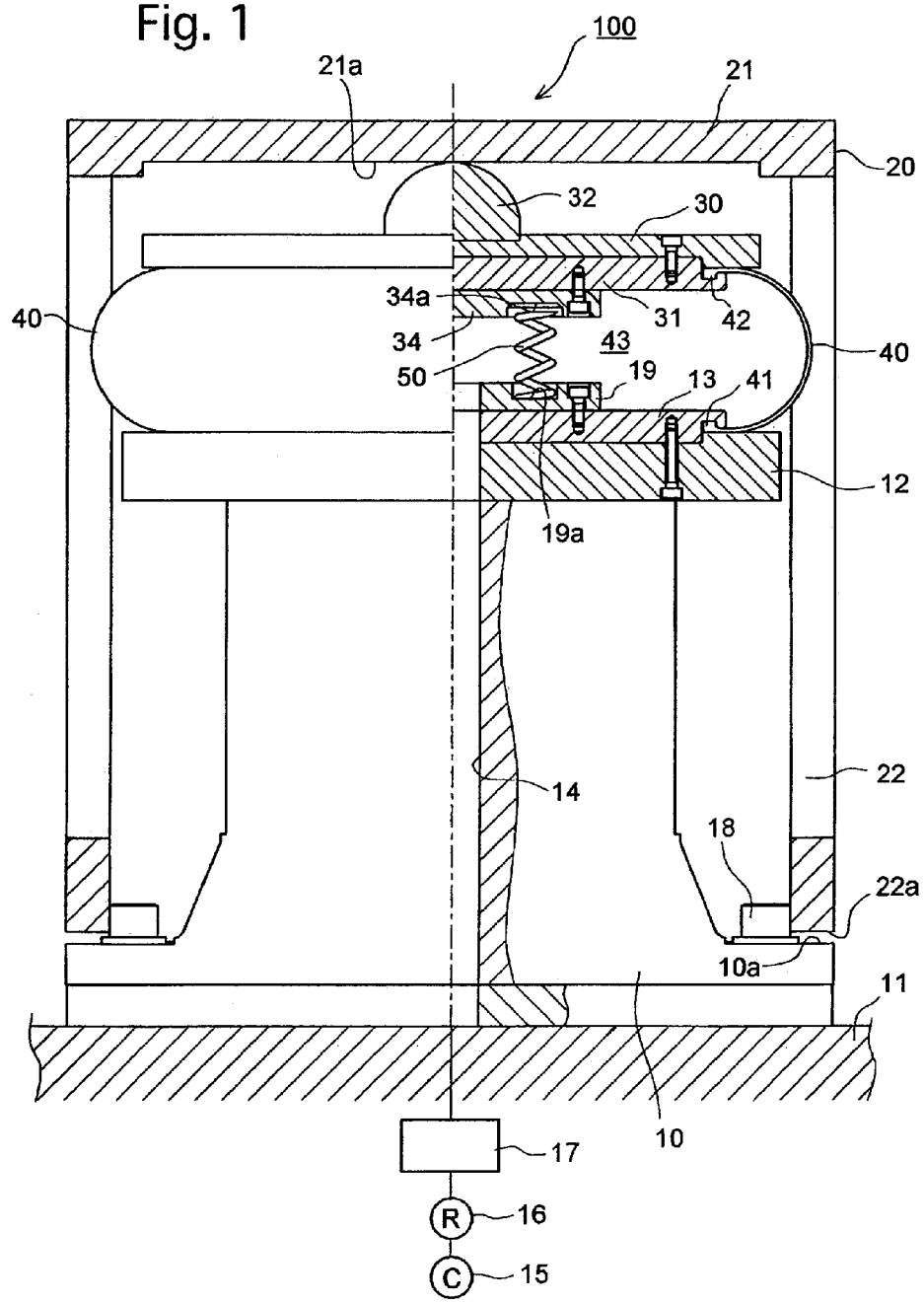
FIG. 1 is a front elevational view of an embodiment of an air-spring vibration isolation device, wherein a right half portion thereof is shown in cross section.

As clearly shown in FIGS. 1 and 5, an embodiment of a vibration isolation device 100 is provided with a column-shaped stationary housing 10, a vibration-free movable base 20, a movable top plate 30, and an annular bellows (airtight flexible member) 40. The stationary housing 10 is placed on a floor 11.

The vibration isolation device 100 is provided with a fixed circular plate 12 which is fixed to an upper end of the stationary housing 10 to define a horizontal plane (to sit in a horizontal position) in a state where the vibration isolation device 100 is properly installed. The bellows 40 is provided along a lower annular edge thereof with a lower bead portion 41 which is held tight between the outer edge of the fixed circular plate 12 and a lower retainer plate 13 fixed to an upper surface of the fixed circular plate 12.

The movable top plate 30 is formed in a circular plate which defines a horizontal plane similarly to the fixed circular plate 12. The bellows 40 is provided along an upper annular edge thereof with an upper bead portion 42 which is held tight between the outer edge of the movable top plate 30 and an upper retainer plate 31 fixed to a lower surface of the movable top plate 30. The movable top plate 30 (with the upper retainer plate 31), the bellows 40 and the fixed circular plate 12 (with the lower retainer plate 13) form an airtight pressure chamber 43.

The stationary housing 10 is provided along an axis thereof with an air passage 14 which communicates with the airtight pressure chamber 43. Compressed air whose pressure is regulated by a compressed air source 15, a regulator 16 and a pressure regulator 17, is supplied to the airtight pressure chamber 43 through the air passage 14.

A dome-shaped (hemispherical) member 32 is fixed to an upper surface of the movable top plate 30 at a planar center thereof. The planar center (axial center) of the dome-shaped member 32 is coaxial with the planar centers (axial centers) of the bellows 40 and the fixed circular plate 12. On the other hand, the vibration-free movable base 20 is provided with a mounting plate portion 21 and a hollow cylindrical portion 22. The mounting plate portion 21 is positioned above the movable top plate 30 so that a plane upper surface of the mounting plate portion 21 extends in a horizontal plane. The hollow cylindrical portion 22 extends downwards from the peripheral edge of the mounting plate portion 21. A lower surface 21a of the mounting plate portion 21 and the dome-shaped member 32 can come into point contact with each other. Namely, the lower surface 21a of the mounting plate portion 21 and the dome-shaped member 32 constitute a dome-shaped contacting portion which is provided between the movable top plate 30 and the mounting plate portion 21.

The limit of downward movement of the vibration-free movable base 20 is determined by the contact engagement of a stop surface 22a which is formed at the bottom end of the hollow cylindrical portion 22 with a stop surface 10a which is formed on the stationary housing 10 to face the stop surface 22a. When the vibration-free movable base 20 is in its downmost position, the two-dimensional positioning of the vibration-free movable base 20 relative to the stationary housing 10 is roughly established by engagement of the hollow cylindrical portion 22 with four positioning bosses 18 (only three of them are shown in FIG. 5) fixed to the stationary housing 10. The hollow cylindrical portion 22 is provided with openings 22b through which corresponding portions of the bellows 40 project outwards. Providing the hollow cylindrical portion 22 with such openings 22b is optional.

The vibration isolation device 100 is provided inside the airtight pressure chamber 43 with a plurality of compression coil springs (biasing device) 50 which are disposed at equi-angular intervals on a circle about a planar center of the fixed circular plate 12 (the movable top plate 30). In this particular embodiment, six compression coil springs 50 (only one of them is shown in each of FIGS. 1 through 5) are disposed inside the airtight pressure chamber 43. A lower spring-seating plate 19 is fixed to an upper surface of the fixed circular plate 12, while an upper spring-seating plate 34 is fixed to a lower surface of the retainer plate 31. A plurality of recesses 19a in which lower ends of the plurality of compression coil springs 50 are respectively accommodated are formed on an upper surface of the lower spring-seating plate 19, while a plurality of recesses 34a are formed on a lower surface of the upper spring-seating plate 34 to face the plurality of recesses 19a, respectively.

Each compression coil spring 50 is simply positioned on the lower spring-seating plate 19 in one recess 19a thereon, and the upper end of each compression coil spring 50 is engaged with or disengaged from the associated recess 34a depending on the internal pressure of the airtight pressure chamber 43. Namely, the length of each compression coil spring 50 is predetermined so that the upper end of the compression coil spring 50 comes into contact with the associated recess 34a of the upper spring-seating plate 34 and so that the dome-shaped member 32 remains in contact with the lower surface 21a of the mounting plate portion 21 of the vibration-free movable base 20 (see FIGS. 3 and 4) if (only when) the internal pressure of the airtight pressure chamber 43 drops below a predetermined value to cause the movable top plate 30 to move down toward the stationary housing 10. On the other hand, when a vibration isolating operation is performed by increasing the internal pressure of the airtight pressure chamber 43 to a predetermined value or beyond, the upper end of each compression coil spring 50 is disengaged from the associated recess 34a of the upper spring-seating plate 34 so as not to exert any spring force (biasing force) on the movable top plate 30 (see FIG. 2).

Figure 2:
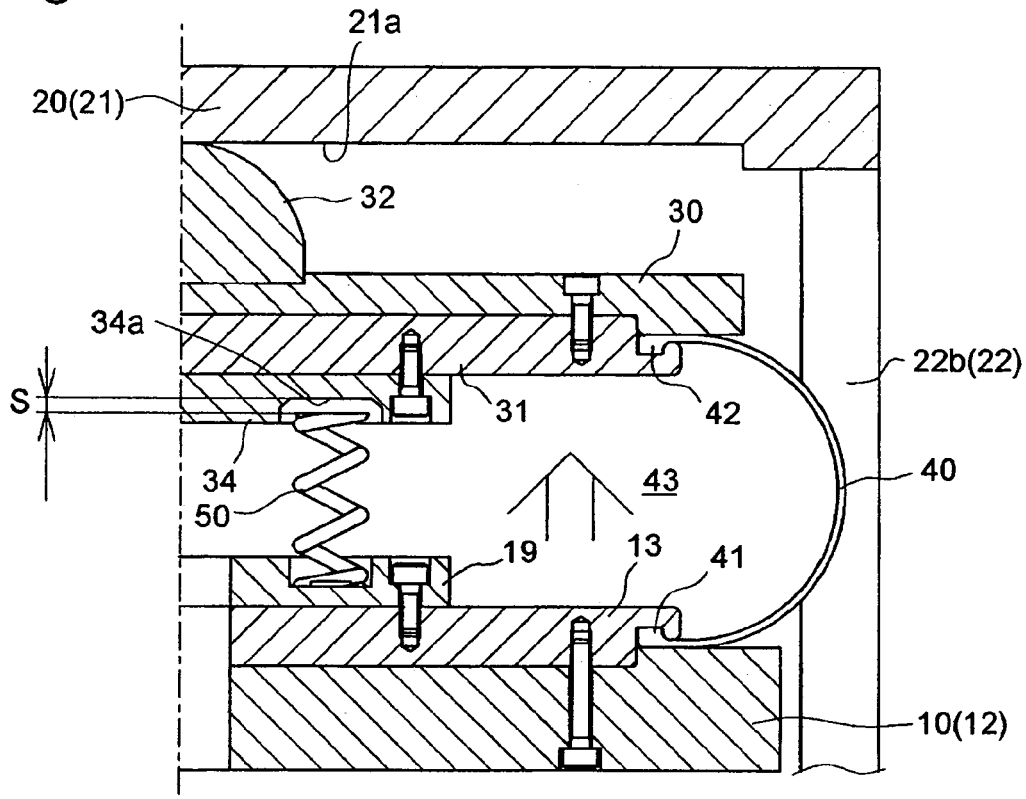
FIG. 2 is an enlarged cross sectional view of a portion of the vibration isolation device shown in FIG. 1 in an operational state of the vibration isolation device, showing an airtight pressure chamber and a peripheral portion thereof.

Accordingly, in the vibration isolation device 100, the dome-shaped member 32, which is fixed to the movable top plate 30, and the lower surface 21a of the mounting plate portion 21 can be kept in contact with each other even in a state where a vibration-isolating pressure, which is sufficient for sustaining a load, is not supplied in the airtight pressure chamber 43 (e.g., a state where the internal pressure of the airtight pressure chamber 43 is made to be equivalent to the barometric pressure). Supposing that the state of the vibration isolation device 100 shown in FIGS. 1 and 2 is a state where a pressure-regulated compressed air at a predetermined pressure has been pumped into the airtight pressure chamber 43, in this state the upper end of each compressed coil spring 50 is disengaged from the upper spring-seating plate 34 to form a clearance S (see FIG. 2) between the upper end of each compressed coil spring 50 and the associated recess 34a. Therefore, in this state, the presence of the plurality of compression coil springs 50 does not exert any influence on a pressure regulating operation performed with the pressure regulator 17.

Figure 3:
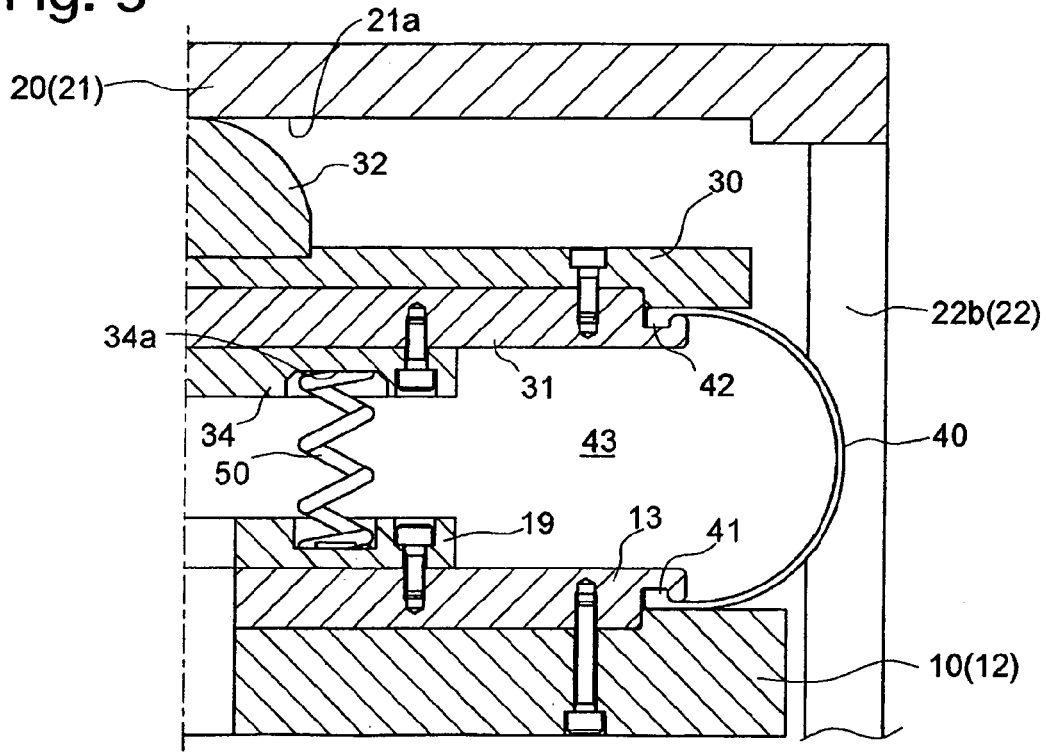
FIG. 3 is a view similar to that of FIG. 2, showing the same portion of the vibration isolation device shown in FIG. 2 in a state wherein the internal pressure of the airtight pressure chamber drops to a degree causing a compression coil spring to come in contact with a movable top plate.
Figure 4:
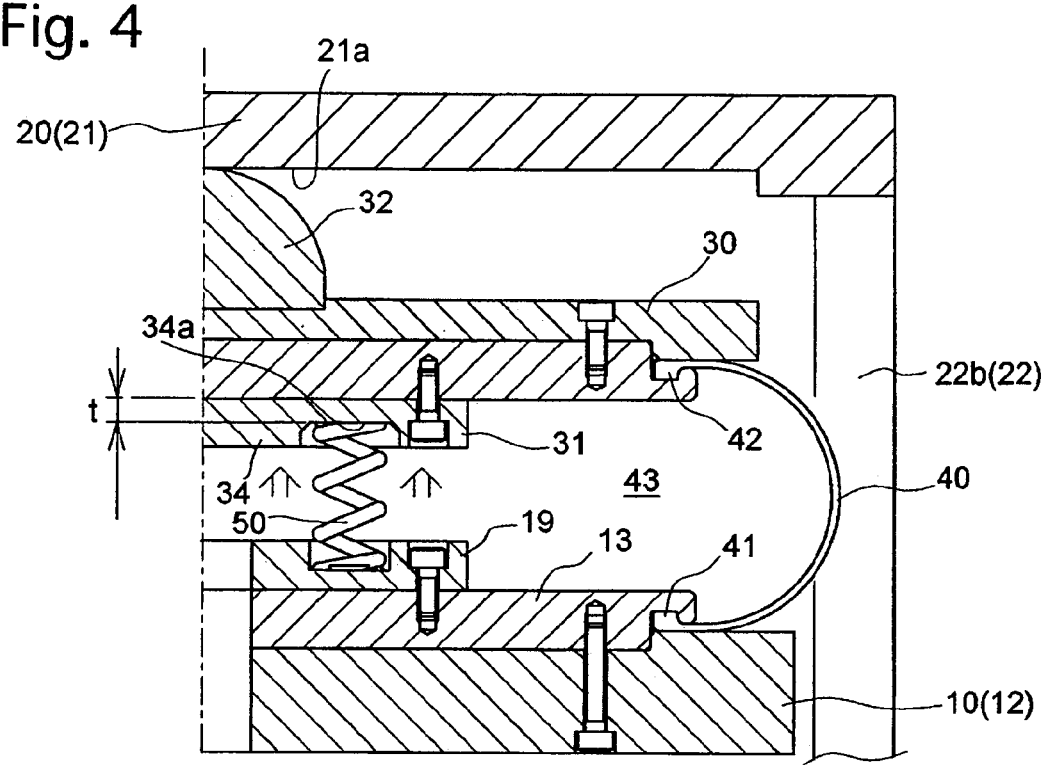
FIG. 4 is a view similar to that of FIG. 3, showing the same portion of the vibration isolation device shown in FIG. 3 in a state wherein the internal pressure of the airtight pressure chamber further drops, wherein the compression coil spring is compressed so that the movable top plate and a vibration-free movable base remain in contact with each other via a dome-shaped contacting portion installed between the movable top plate and the vibration-free movable base.

Conversely, if the internal pressure of the airtight pressure chamber 43 is made to fall at the time when, e.g., the vibration isolation device 100 is in a non-operational state, the movable top plate 30 moves down to eliminate the clearance S, so that the upper end of each compressed coil spring 50 comes in contact with the associated recess 34a as shown in FIG. 3. At the same time, the vibration-free movable base 20 moves down by its own weight and the weight of an object mounted on the mounting plate portion 21. The limit of this downward movement of the vibration-free movable base 20 is determined by the engagement of the stop surface 22a with the stop surface 10a. When the vibration-free movable base 20 is positioned at this physically lower limit of movement thereof, each compression coil spring 50 is compressed by the vibration-free movable base 20 and the movable top plate 30. FIG. 4 shows this state in which the vibration-free movable base 20 is positioned at the lower moving limit thereof relative to the movable top plate 30. In this state shown in FIG. 4, each compression coil spring 50 is compressed by an amount t, while the dome-shaped member 32 and the lower surface 21a of the mounting plate portion 21 remain in contact with each other. Accordingly, in the present embodiment of the vibration isolation device 100, the dome-shaped member 32 and the lower surface 21a of the mounting plate portion 21 can be held in contact with each other even if the internal pressure of the airtight pressure chamber is made equivalent to barometric pressure. Therefore, in the present embodiment of the vibration isolation device 100, the planar center of the movable top plate 30 and the planar center of the mounting plate portion 21 do not deviate from each other when the vibration isolation device 100 is in a non-operational state, which makes it possible to reproduce the previous state of the vibration isolation device 100 easily when the vibration isolation device 100 resumes operating after the non-operational state of the vibration isolation device 100.

Figure 6:
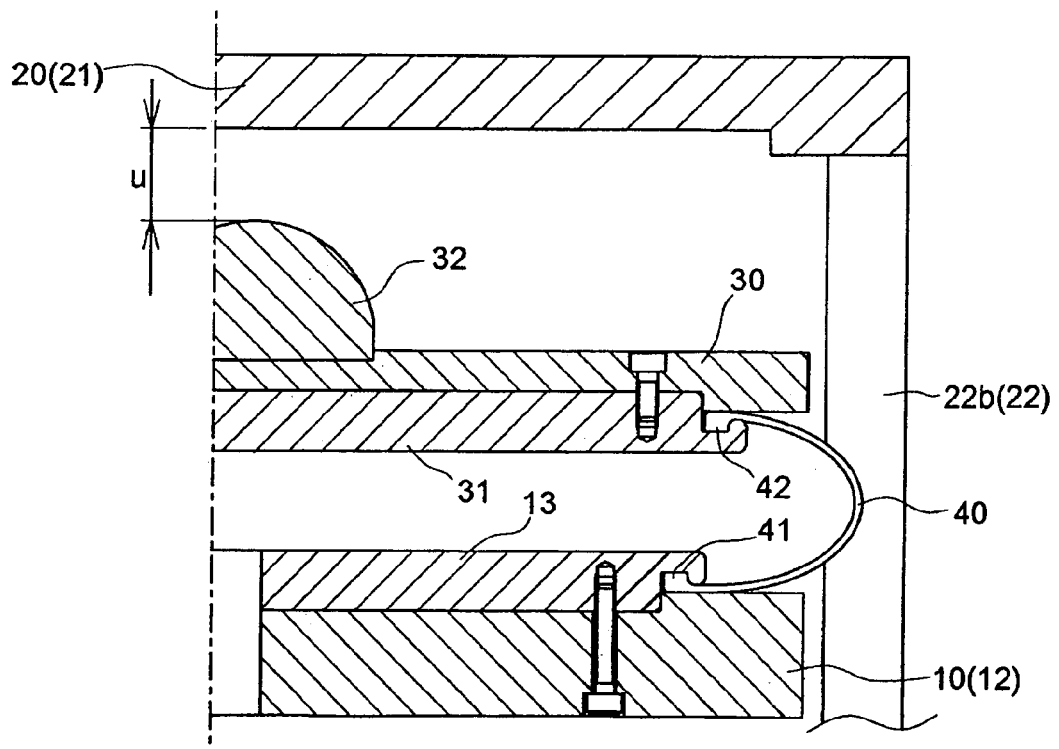
FIG. 6 is an enlarged cross sectional view of a portion of a comparative vibration isolation device in a state corresponding to the state of the vibration isolation device shown in FIG. 4.

FIG. 6 shows a non-operational state of a comparative vibration isolation device which is not equipped with either compression coil springs (which correspond to the plurality of compression coil springs 50) or lower and upper spring-seating plates (which correspond to the lower and upper spring-seating plates 19 and 34). A reduction of the internal pressure of the airtight pressure chamber 43 causes the movable top plate 30 to move down by its own weight while bending the bellows 40 to thereby make the dome-shaped portion 32 and the lower surface 21a of the mounting plate portion 21 disengaged from each other (thus causing a clearance U as shown in FIG. 6). However, a point of contact between the dome-shaped portion 32 and the lower surface 21a of the mounting plate portion 21 deviates from the previous point of contact therebetween when a vibration isolating pressure is again introduced into the airtight pressure chamber 43 to move up the movable top plate 30, which makes it impossible to precisely reproduce the previous state of the vibration isolation device when the vibration isolation device 100 resumes operating after a non-operational state of the vibration isolation device.

Although each compression coil spring 50 is simply positioned on the lower spring-seating plate 19 (on the stationary housing side) in one recess 19a thereon in the above described embodiment of the vibration isolation device, the lower end of each compression coil spring 50 can be fixed to the lower spring-seating plate 19 by a retainer (e.g., set screw) to prevent the position of the compression coil spring 50 from varying. It is also possible to fix the upper end of each compression coil spring 50 relative to the movable top plate 30. The number of the compression coil springs 50 is optional. Each compression coil spring 50 can be replaced by a leaf spring or the like, one end of which being fixed relative to the fixed circular plate 12 or the movable top plate 30. In the above illustrated embodiment of the vibration isolation device, the biasing device such as the compression coil springs 50 can be any other biasing device which has a sufficient degree of freedom in positioning the biasing device if the biasing device has a capability of holding the dome-shaped member 32 (on the movable top plate 30) and the mounting plate portion 21 contacting with each other when the internal pressure of the airtight pressure chamber 43 is reduced, e.g., when the vibration isolation device 100 is in a non-operational state and if the biasing device does not exert any biasing force on the movable top plate 30 to thus exert no influence thereon during the vibration isolating operation of the vibration isolation device 100.

Although in the above described embodiment of the vibration isolation device the dome-shaped member 32 is installed on the movable top plate 30 while a portion of the mounting plate portion 21 which comes in contact with the movable top plate 30 is formed as a flat surface to embody the dome-shaped contacting portion, via which the mounting plate portion 21 of the vibration-free movable base 20 and the movable top plate 30 can come in point contact with each other, it is possible for the dome-shaped member 32 be fixed to the mounting plate portion 21 to project downwards toward the movable top plate 30 and for a portion of the movable top plate 30 which can come in contact with the dome-shaped member 32 to be formed as a flat surface to embody the dome-shaped contacting portion.

Although the bellows 40 has a single pleat in the above illustrated embodiment of the vibration isolation device, the bellows 40 can be of a type having more than one pleat.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A vibration isolation device comprising:
a stationary housing;
a movable top plate positioned horizontally above said stationary housing;
an airtight flexible member for forming an airtight pressure chamber between said movable top plate and said stationary housing;
a vibration-free movable base having a mounting plate portion on which an object to be isolated from vibration is mounted, said vibration-free movable base being positioned horizontally to face said movable top plate, and being capable of moving up and down relative to said stationary housing; and
a dome-shaped contacting portion, provided between opposed surfaces of said movable top plate and said mounting plate portion, via which planar centers of said movable top plate and said mounting plate portion are capable of coming into point contact with each other,
wherein said movable top plate is moved up and down by varying an internal pressure of said airtight pressure chamber,
wherein said vibration-free movable base is moved up and down via said dome-shaped contacting portion, and
wherein said vibration isolation device includes a biasing device, positioned inside said airtight pressure chamber, for defining a downward movement limit of said movable top plate relative to said stationary housing, and for holding said planar centers of said movable top plate and said mounting plate portion in contact with each other when said internal pressure of said airtight pressure chamber is smaller than a predetermined value.

2. The vibration isolation device according to claim 1, wherein said biasing device is positioned inside said airtight pressure chamber in such a manner as to exert no biasing force on said movable top plate when said vibration isolation device performs a vibration isolating operation in a state where said internal pressure of said airtight pressure chamber is one of equal to and greater than said predetermined value.

3. The vibration isolation device according to claim 1, wherein said biasing device comprises a plurality of springs installed between said movable top plate and said stationary housing.

4. The vibration isolation device according to claim 3, wherein said plurality of springs are positioned at equi-angular intervals.

5. The vibration isolation device according to claim 3, wherein each of said plurality of springs comprises a compression coil spring.

6. The vibration isolation device according to claim 5, wherein said compression coil spring is fixed at one end thereof to one of said movable top plate and said stationary housing.

7. The vibration isolation device according to claim 5, further comprising:
a first spring-seating plate fixed to said movable top plate, said first spring-seating plate having a first plurality of recesses; and
a second spring-seating plate fixed to said stationary housing to face said first spring-seating plate, said second spring-seating plate having a second plurality of recesses,
wherein said plurality of compression coil springs are positioned between said first spring-seating plate and said second spring-seating plate so that one end of each of said plurality of compression coil springs is accommodated in each corresponding one of said second plurality of recesses, and so that the other end of each of said plurality of compression coil springs is capable of being engaged and disengaged with each corresponding one of said first plurality of recesses.

8. The vibration isolation device according to claim 1, wherein said dome-shaped contacting portion comprises:
a dome-shaped member formed on an upper surface of said movable top plate to project upwards; and
a plane lower surface of said mounting plate portion with which said dome-shaped member is capable of coming into contact.

9. The vibration isolation device according to claim 1, wherein said vibration-free movable base comprises a hollow cylindrical portion which extends downwards from an peripheral edge of said mounting plate portion, and
wherein a downward movement limit of said vibration-free movable base is determined by engagement of a bottom end surface of said hollow cylindrical portion with a stop surface formed on said stationary housing.

10. The vibration isolation device according to claim 9, further comprising a horizontal plate fixed to an upper end of said stationary housing, wherein said airtight flexible member comprises an annular bellows, opposite ends of which are fixed to said horizontal plate and said movable top plate, respectively.

11. A vibration isolation device comprising:

a stationary housing;

a horizontal plate fixed to an upper end of said stationary housing;

a movable top plate positioned horizontally above said horizontal plate;

a mounting plate on which an object to be isolated from vibration is mounted, said mounting plate being positioned horizontally to face said movable top plate in a manner to be capable of moving up and down relative to said stationary housing;

a bellows installed between said movable top plate and said horizontal plate to form an airtight pressure chamber therebetween;

a dome-shaped member fixed to an upper surface of said movable top plate to project upwards toward a bottom surface of said mounting plate; and a biasing device, positioned inside said airtight pressure chamber, for defining a downward movement limit of said movable top plate relative to said stationary housing, and for holding said planar centers of said movable top plate and said mounting plate in contact with each other when an internal pressure of said airtight pressure chamber is smaller than a predetermined value.

* * * * *